United States Patent
Sheng et al.

(10) Patent No.: US 9,711,129 B2
(45) Date of Patent: Jul. 18, 2017

(54) EXTRAORDINARY ACOUSTIC ABSORPTION INDUCED BY HYBRID RESONANCE AND ELECTRICAL ENERGY GENERATION FROM SOUND BY HYBRID RESONANT METASURFACE

(71) Applicant: THE HONG KONG UNIVERSITY OF SCIENCE AND TECHNOLOGY, Hong Kong (CN)

(72) Inventors: Ping Sheng, Hong Kong (CN); Zhiyu Yang, Hong Kong (CN); Guancong Ma, Hong Kong (CN); Min Yang, Hong Kong (CN); Songwen Xiao, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 14/889,151

(22) PCT Filed: Jul. 17, 2014

(86) PCT No.: PCT/CN2014/082385
§ 371 (c)(1),
(2) Date: Nov. 5, 2015

(87) PCT Pub. No.: WO2015/007221
PCT Pub. Date: Jan. 22, 2015

(65) Prior Publication Data
US 2016/0078857 A1    Mar. 17, 2016

Related U.S. Application Data

(60) Provisional application No. 61/958,025, filed on Jul. 18, 2013, provisional application No. 61/963,941, filed on Dec. 19, 2013.

(51) Int. Cl.
*G10K 11/162* (2006.01)
*G10K 11/172* (2006.01)
(Continued)

(52) U.S. Cl.
CPC ............ *G10K 11/172* (2013.01); *G10K 11/02* (2013.01); *G10K 11/162* (2013.01); *H02K 35/00* (2013.01)

(58) Field of Classification Search
CPC .. G10K 11/162; G10K 11/172; G10K 11/002; G10K 11/168; G10K 11/16; H02K 35/00
(Continued)

(56) References Cited

U.S. PATENT DOCUMENTS 2,166,848 A * 7/1939 Prudden ................. E04B 1/8409
                                                                181/208
2,541,159 A * 2/1951 Geiger ..................... E04B 1/84
                                                                181/208
(Continued)

FOREIGN PATENT DOCUMENTS

CN          1664920 A     9/2005
FR          2966415 A1    4/2012

*Primary Examiner* — Edgardo San Martin
(74) *Attorney, Agent, or Firm* — Nath, Goldberg & Meyer; Jerald L. Meyer

(57) ABSTRACT

A sound absorbing metamaterial comprises an acoustic impedance-matched surface configured to minimize reflection from an incident acoustic wave. The surface is comprised of an elastic or flexible membrane and a substantially rigid mass mounted on the membrane. A relatively solid surface is provided as a reflective surface and is positioned behind the membrane. The reflective surface is separated by a predetermined distance from the elastic or flexible membrane and forms a fluid space between the membrane and the
(Continued)

solid surface. The mass mounted on the membrane, in combination with the elastic membrane establish a plurality of eigenfrequencies.

30 Claims, 8 Drawing Sheets

(51) Int. Cl.
*G10K 11/02* (2006.01)
*H02K 35/00* (2006.01)
*G10K 11/16* (2006.01)

(58) Field of Classification Search
USPC .......................................................... 181/207
See application file for complete search history.

(56) References Cited

U.S. PATENT DOCUMENTS

| | | | | |
|---|---|---|---|---|
| 6,478,110 B1* | 11/2002 | Eatwell | ................ | G10K 11/16 181/207 |
| 6,739,425 B1* | 5/2004 | Griffin | ................ | G10K 11/16 181/171 |
| 7,267,196 B2* | 9/2007 | Mathur | ................ | G10K 11/175 181/198 |
| 7,395,898 B2* | 7/2008 | Yang | ................ | G10K 11/172 181/286 |
| 8,129,885 B2* | 3/2012 | Lee | ................ | H02N 2/186 310/324 |
| 8,579,073 B2* | 11/2013 | Sheng | ................ | G10K 11/172 181/207 |
| 8,616,330 B1* | 12/2013 | McKnight | ................ | G10K 11/16 181/207 |
| 8,752,667 B2* | 6/2014 | McKnight | ................ | G10K 11/172 181/207 |
| 8,770,344 B2* | 7/2014 | Borroni | ................ | E04B 1/86 181/288 |
| 8,857,564 B2* | 10/2014 | Ma | ................ | G10K 11/18 181/284 |
| 8,869,933 B1* | 10/2014 | McKnight | ................ | G10K 11/172 181/207 |
| 8,960,365 B2* | 2/2015 | Sheng | ................ | G10K 11/172 181/207 |
| 9,004,226 B1* | 4/2015 | McKnight | ................ | G10K 11/16 181/284 |
| 9,076,429 B2* | 7/2015 | Islam | ................ | G10K 11/172 |
| 9,466,283 B2* | 10/2016 | Yang | ................ | G10K 11/172 |
| 9,520,121 B2* | 12/2016 | Sheng | ................ | G10K 11/172 |
| 2002/0114928 A1* | 8/2002 | Sheng | ................ | B29C 70/60 428/195.1 |
| 2007/0014418 A1* | 1/2007 | Eatwell | ................ | F16F 7/1005 381/71.8 |
| 2009/0223738 A1* | 9/2009 | Nakamura | ................ | G10K 11/172 181/175 |
| 2011/0240402 A1* | 10/2011 | Chou | ................ | F16F 7/104 181/207 |
| 2012/0240486 A1* | 9/2012 | Borroni | ................ | B32B 3/266 52/145 |
| 2013/0025961 A1* | 1/2013 | Koh | ................ | F16F 15/02 181/207 |
| 2013/0133979 A1* | 5/2013 | Sheng | ................ | G10K 11/172 181/294 |
| 2014/0060962 A1* | 3/2014 | Sheng | ................ | G10K 11/172 181/207 |
| 2016/0293154 A1* | 10/2016 | Yang | ................ | G10K 11/172 |

* cited by examiner

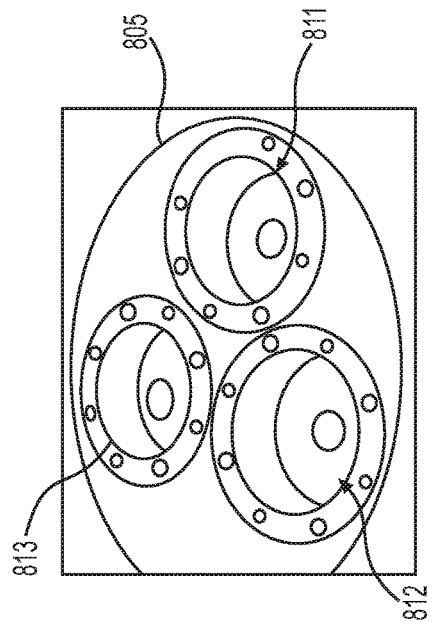
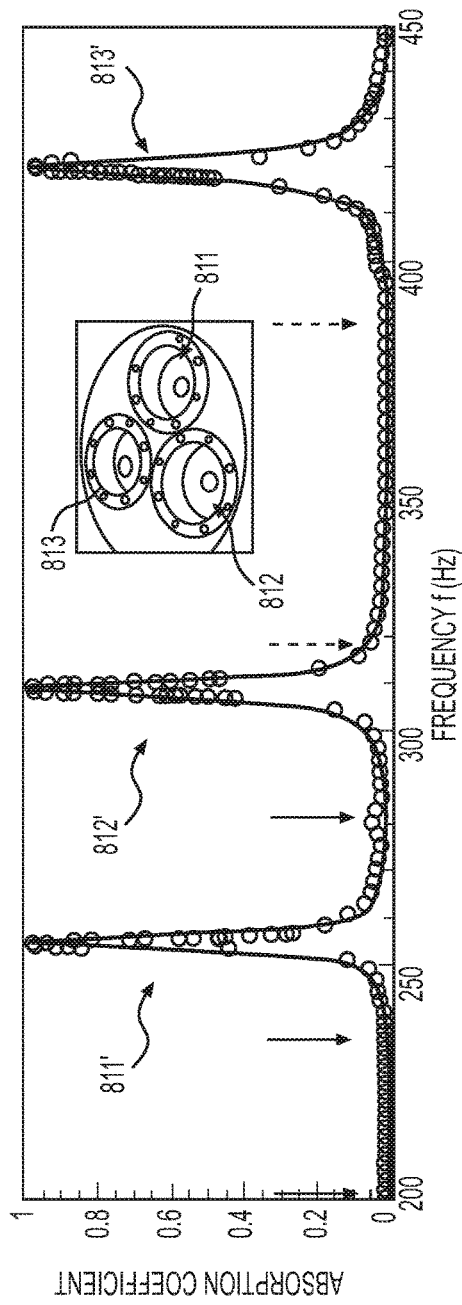
FIG. 8A
FIG. 8B

EXTRAORDINARY ACOUSTIC ABSORPTION INDUCED BY HYBRID RESONANCE AND ELECTRICAL ENERGY GENERATION FROM SOUND BY HYBRID RESONANT METASURFACE

This is a National Phase Application filed under 35 U.S.C. 371 as a national stage of PCT/CN2014/082385, filed Jul. 17, 2014, an application claiming the benefit of U.S. Application No. 61/958,025, filed Jul. 18, 2013, and U.S. Application No. 61/963,941, filed Dec. 19, 2013, the content of each of which is hereby incorporated by reference in its entirety.

BACKGROUND

Field

This disclosure relates to acoustic metamaterial that relates to energy generation using hybrid resonant metastructures.

Background

Acoustic metamaterials are manufactured or synthetic structures that aim to achieve acoustic/elastic properties which are not available in tradition materials. In particular, negativity in effective dynamic mass density was demonstrated in various different designs. Materials with negative acoustic properties present a negative mass density and bulk modulus, and therefore a negative index of refractivity. Negative effective bulk modulus was also realized in fluid channels with cavity resonators. Other effects such as focusing, image magnifying, acoustic cloaking, total absorption were also realized experimentally. Currently, simultaneous negativity in both effective mass density and bulk modulus was only achieved by a composite structure of membranes and pipe with side-holes.

The past decade witnessed the arrival of acoustic metamaterials which expanded the horizon of sound wave manipulations. Phenomena such as extreme attenuations, cloaking, sub-diffraction imaging and manipulations, low frequency total absorption of airborne sound, were conceived and subsequently realized. Many of these breakthroughs benefit from the emergence of an approach which reduces a complex system to a fictitious homogenous material that is characterized by a small set of effective constitutive parameters. It is desired to apply a similar approach to tackle the problem of acoustic absorption of low frequency sound, a traditionally very difficult problem.

The absorption of airborne acoustic waves has long been a problem with both fundamental and practical interest. Various techniques such as porous/fibrous bulk materials, micro-perforations, resonant structures, and random scatterers, have been employed to improve sound absorption performance of either certain particular frequencies, or over a broad frequency band. These approaches seek to damp acoustic energy by increasing the dissipation coefficient, delaying the propagation of the wave, or boosting the energy density within the absorber.

The dissipation of sound is essentially the conversion of kinetic energy of air particles to heat. Ultimately this must be carried out via a combination of viscosity and friction; i.e., dissipative energy is generally proportional to the square of the first time-derivative of displacement (in linear systems) times the viscosity coefficient. Despite this, a large viscosity coefficient may not necessarily lead to large absorption, since it may simultaneously cause impedance mismatch between air and the absorber. In such case a good portion of the incident energy would be reflected at the interface. Therefore, only when the viscosity and the impedance of the whole system fit certain criteria can the absorber reach its optimal performance.

One of the characteristics of metamaterials is that, according to their basic design, they can reach a point of superabsorption, in which the platelet or mass vibrates at maximum amplitude. It would be desired to be able to extract energy absorbed by the metamaterials in order to increase the capacity of the metamaterials to absorb sound or other vibrational energy.

SUMMARY

A sound absorbing metamaterial comprises an acoustic impedance-matched surface configured to minimize reflection from an incident acoustic wave. The surface is comprised of an elastic or flexible membrane and a substantially rigid mass mounted on the membrane. A relatively solid surface is provided as a reflective surface and is positioned behind the membrane. The reflective surface is separated by a predetermined distance from the elastic or flexible membrane and forms a fluid space between the membrane and the solid surface. The mass mounted on the membrane, in combination with the elastic membrane establish a plurality of eigenfrequencies.

In one particular configuration, an electrical generator is operatively connected to the membrane, so that it is capable of extracting vibrational energy from the membrane sufficiently to attenuate the vibrational energy. The extracting of the vibrational energy converts part of the absorbed sound energy, which was dissipated to heat for the absence of electrical generator, into electrical energy.

In another particular configuration, a thin sheet is supported above the membrane, separated from the membrane sufficiently to respond to wind movement. The wind movement causes the thin sheet to flap and undulate, resulting in pressure changes at the membrane, in turn generating electrical energy in response to the wind movement.

BRIEF DESCRIPTION OF THE DRAWINGS

FIG. 1A shows the cell, and FIG. 1B shows two modes of displacement of the cell.

FIG. 2A shows a group of three identical absorber units. FIG. 2B shows details of one of the absorber units of FIG. 2A.

FIG. 7B depicts absorption coefficient plotted as a function of frequency. FIG. 7C is a plot of a measured vibrational profile at 152 Hz. This appears as a symmetrically plot, using data along the radial direction on one side. FIG. 7D is a plot of electromotive force (EMF) generated by vibration of the central platelet as a function of frequency.

FIGS. 8A and 8B are diagrams showing near-unity absorption (>99%) attained at tunable multiple frequencies. FIG. 8A shows an arrangement in which an impedance tube contains three hybrid resonant units. FIG. 8B depicts absorption coefficient plotted as a function of frequency.

FIG. 9A shows the dimensionless dissipation parameter and the thickness of the sealed gas layer. FIG. 9B shows the variance of normal displacement at the hybrid resonance frequency.

FIG. 10A shows the cell in a static condition. FIG. 10B shows the cell in a wind condition.

DETAILED DESCRIPTION

Overview

Figure 1A:
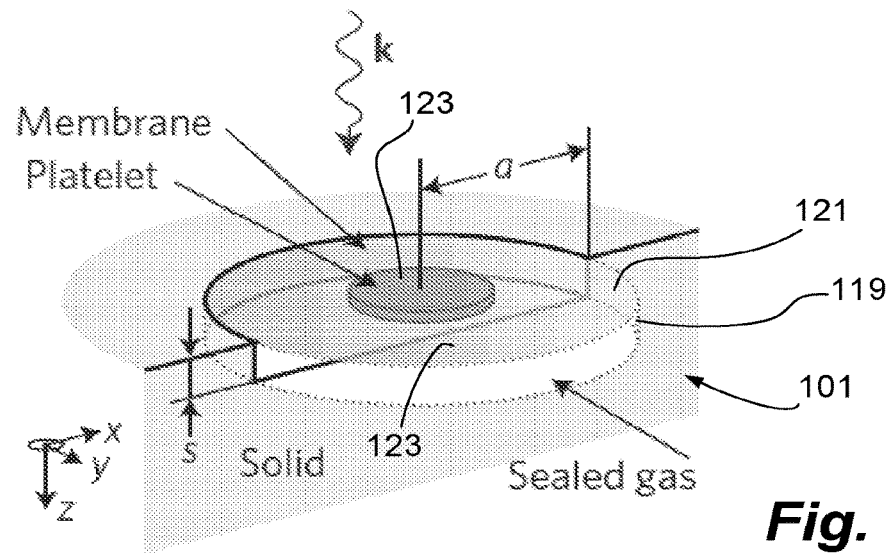
FIGS. 1A and 1B are diagrams showing a metamaterial cell.

An acoustic impedance-matched surface has the property that an incident acoustic wave generates no reflection, so that the wave is either completely transmitted through the surface, or totally absorbed. By covering a reflecting solid surface with a decorated or augmented elastic membrane that is separated from the surface with a narrow gap, it is possible to realize a robust hybrid resonance, comprising two resonant eigenmodes. The resonance enables perfect impedance matching to an airborne sound or vibration.

The elastic membrane is separated from the reflecting solid surface by a predetermined distance defining the narrow gap. By selecting the predetermined gap and the resonant frequency of the decorated or augmented elastic membrane, two eigenmodes are established. The eigenmode is determined by the structure parameters (as radius, central mass) of the decorated membrane only, when the hybrid resonance mode is related to the air cavity behind which provided additional impedance and bring the two eigenmode together to form this new hybrid mode. The two eigenmodes are given by way of non-limiting example, and the membrane-weight structure with fixed boundary have many intrinsic eigenmodes at corresponding eigenfrequencies, the two mentioned above are just the first and second eigenmode of the membrane-weight structure. In one non-limiting example, the eigenfrequencies may be determined by the membrane structure itself, as opposed to the air separation or the reflector.

By exploiting the anomalous effective mass density behavior of membrane-type acoustic metamaterials (MAMs) near the anti-resonance, it can be shown that a totally reflective surface, when coupled with a narrow air chamber with a reflected back surface, can be brought to match the impedance of air at particular frequencies, thereby completely eliminating the reflected sound and allowing total absorption. The condition for this extraordinary absorption is identified as mimicking the situation of total transmission, which is also a state with zero reflection. It should be emphasized that in the present case, total absorption of low frequency sound is achieved with a record-low device thickness.

The dissipative power is usually quadratic in the rate of change of the local displacement; hence low frequency sound absorption is a traditionally difficult task. A common approach to maximize the dissipation involves setting the absorber in resonance, at which point maximum displacement is likely to occur. According to the present disclosure, extraordinary acoustic absorption of low frequency sound, e.g., over 99% at frequencies around 200 Hz, is achieved by an absorbing device comprising a decorated or augmented membrane backed by a narrow air cavity. It is found that when the decorated or augmented membrane is coupled to the narrow cavity with a reflecting back surface, a new resonance of the system can be generated, in which the total effective mass of the device is close to zero at a frequency close to the anti-resonance of a single decorated or augmented membrane. This yields an impedance-match condition with sound propagating in air, thereby leading to near-zero reflection. Since the device is backed by a totally reflecting back surface, there can be no transmission either; hence all the incident energy is absorbed. Experimentally, near-total absorption of sound is found, with wavelength more than 1-2 orders of magnitude larger than the thickness of the absorber device.

In one non-limiting example, a hybrid resonance frequency of 170 Hz is selected and the resonance frequency is tunable. The membrane's maximum displacement amplitude can reach 10µ, which is more than an order of magnitude larger than that of the incident sound with an intensity of 1 Pa, even though the averaged displacement over the whole membrane is much smaller. It is shown that, as a result of the large displacement amplitude total absorption can be achieved.

The present disclosure relates to a configuration of an acoustic device that exhibits extraordinary absorption performance for low frequency airborne sound. Near-total absorption is achieved with absorption cross section significantly larger than the device's lateral dimension.

The dissipation of sound is essentially the conversion of kinetic energy of air particles to heat. Ultimately this must be carried out via viscosity/friction; i.e., dissipation is proportional to the first time-derivative of displacement (in linear systems) times the viscosity coefficient. Despite this, a large viscosity coefficient may not necessarily lead to large absorption, since it may simultaneously cause impedance mismatch between air and the absorber. In such cases, a good portion of the incident energy would be reflected at the interface. Therefore, only when the viscosity and the impedance of the whole system fit certain criteria can the absorber reach its optimal performance. By exploiting the anomalous effective mass density behavior of membrane-type acoustic metamaterials (MAMs) near the anti-resonance, it can be shown that a totally reflective surface, when coupled with a narrow air chamber with a reflected back surface, can be brought to match the impedance of air at particular frequencies, thereby completely eliminating the reflected sound and allowing total absorption. The condition for this extraordinary absorption is identified as mimicking the situation of total transmission, which is also a state with zero reflection In the present case, total absorption of low frequency sound is achieved with a very-low device thickness.

While "zero reflection" and "total absorption" are described, it is understood that the absorption is not going to be perfect, and that the actual results are of substantially attenuated reflection or significant absorption. Therefore, when absolute terminology is used herein, it is intended to describe a result consistent with the theoretical results, but with actual results differing by a reasonable amount.

According to the present disclosure, an acoustic device is provided, which can achieve total absorption of low frequency airborne sound. The configuration comprises a piece of decorated or augmented membrane-type acoustic metamaterial (MAM), a fluid cavity, and a totally reflective surface. The MAM typically comprises one thin elastic membrane with fixed boundary. The decoration or augmentation is established by fixing an object with designated mass to the membrane. The object can be a rigid or substantially rigid mass and is attached to the center of the membrane in order to tune the system's eigenfrequencies.

The narrow fluid chamber with depth h comprises a totally reflective back surface which may be simply a solid plate with sufficient stiffness and thickness, or another piece of MAM functioning at the anti-resonance, which is sealed by the frontal MAM. The fluid inside the cavity may be air, or other type of gases. The MAM together with the cavity can effectively bring the reflective surface to be impedance-matched with the air, thereby eliminating all reflection. The same concept can be applied to cases where the fluid inside and outside the cavity is liquid, such as water.

Structure of Metamaterials

The gas and reflecting surface effectively add an extra impedance, in series, to the MAM, thereby changing its resonant condition. The above-mentioned eigenmodes are forced to hybridize in the formation of new resonant modes whose frequencies are in-between the previous set of eigenfrequencies. Such hybrid resonances are largely the linear superposition of the two original nearby eigenmodes, and therefore retain their characteristics.

Figure 1B:
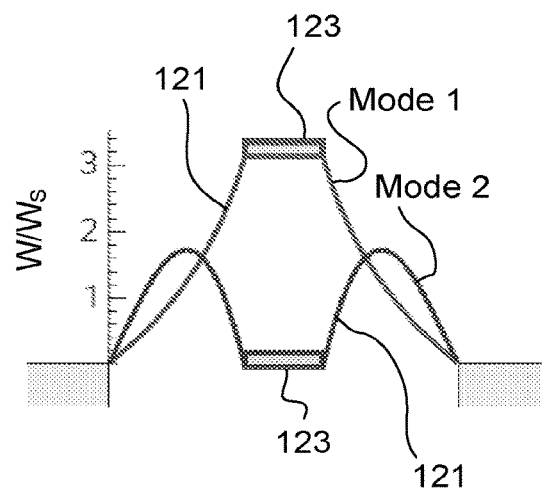

FIGS. 1A and 1B are diagrams showing a metamaterial cell. FIG. 1A shows cell 101 comprising tube 119, supporting a single piece of membrane 121 with circular rigid platelet 123 adhered to the center of the membrane. The other end of tube 119 is blocked by an aluminum plate 127, which plays the role of a totally reflective surface. Membrane 121 is positioned a predetermined distance from reflective plate 127. FIG. 1B schematically shows movement of the membrane 121 and platelet 123, depicted as Mode 1 and Mode 2.

Central to the understanding of hybrid modes' behavior and functionalities is that only the piston-like component of the average membrane oscillation, $\langle W \rangle$, couples to transmission and reflection. Here W denotes the normal displacement of the membrane, which is a function of position as shown in FIG. 1B for the two resonant eigenfunctions, and the angular brackets denote averaging over the area of the membrane. The variance of the displacement, defined as $\Delta W = \sqrt{\langle (\delta W)^2 \rangle}$, where $\delta W = W - \langle W \rangle$, is decoupled from the radiation modes and hence can be characterized as "deaf." The reason for the decoupling can be seen from the Fourier wavevectors $\vec{k}_\parallel$ that delineate the lateral spatial pattern of W. For $\delta W$, $|\vec{k}_\parallel| > 2\pi/\lambda$ necessarily, since $a \ll \lambda$. Owing to the displacement continuity condition and the wave equation, we have $(k_\parallel)^2 + (k_\perp)^2 = (2\pi/\lambda)^2$ for the acoustic wave in air, where $k_\perp$ denotes the wavevector component normal to the membrane. It follows that the $\delta W$ component of the displacement couples only to the evanescent wave, since its associated $k_\perp$ must be imaginary. In contrast, since the $\vec{k}_\parallel$ components for $\langle W \rangle$ have a distribution which peaks at $|\vec{k}_\parallel| = 0$, it can couple to the radiation modes, i.e., reflection and transmission waves. Hence if we restrict our considerations to only the radiation modes, then one can treat the problem of our acoustic metasurface as essentially one dimensional in character. The surface impedance, which is required to match that of air, can be defined by using only the $\langle W \rangle$ component, given by $Z = \langle \delta p \rangle / \langle \dot{W} \rangle$, with $\delta p$ denoting pressure variation and the over-dot denotes time derivative. Notice that the surface-averaged Green function is defined by $\langle G \rangle = \langle W \rangle / \langle \delta p \rangle$. Hence for time-harmonic motion with angular frequency $\omega$, we have $Z = (-i\omega \langle G \rangle)^{-1}$.

Hybrid resonance can be measured by configuring the metamaterials as an electrical transducer, as will be described in connection with FIGS. 7-9.

Realization of the Total Absorber

Figure 2A:
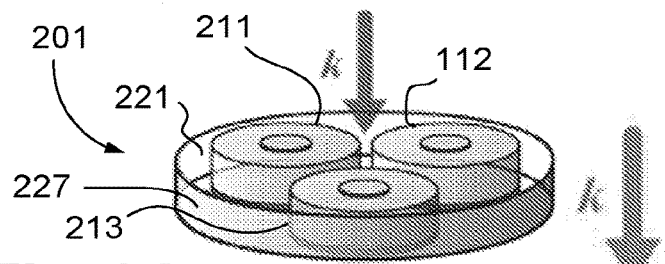
FIGS. 2A and 2B are schematic depictions of a group of absorber units.
Figure 2B:
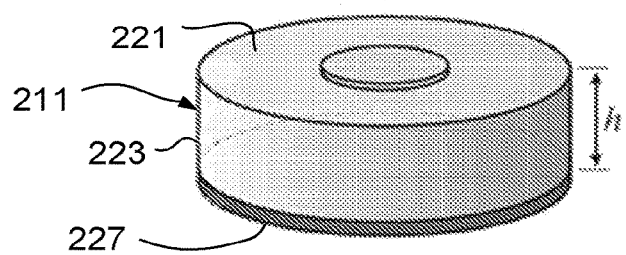
Figure 3:
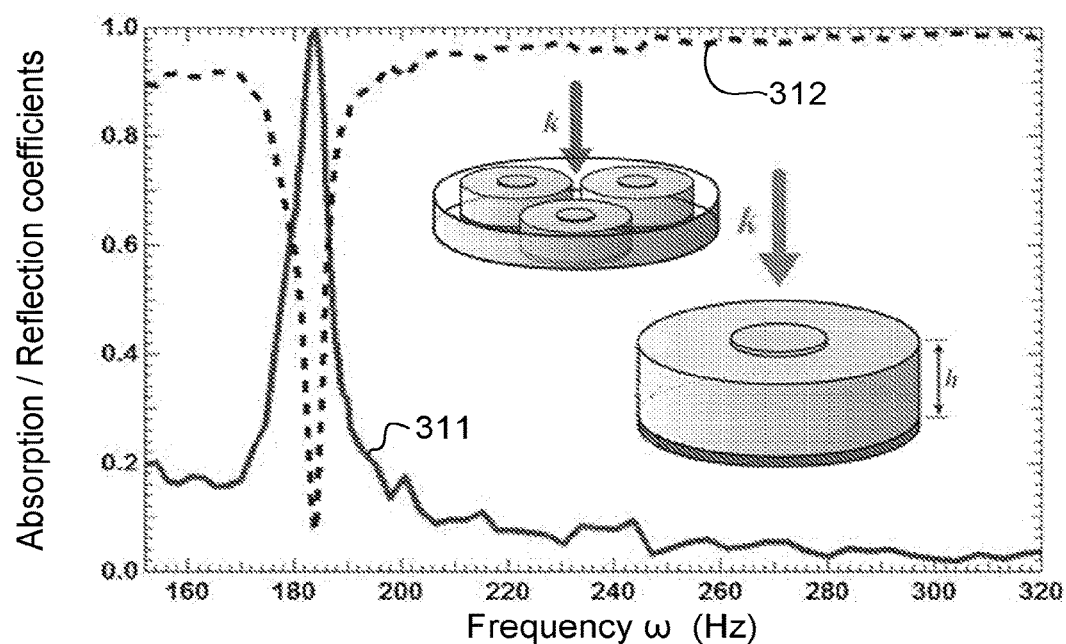
FIG. 3 is a graphic depiction showing measured absorption (solid line curve) and reflection (dashed line curve) coefficients of the three identical absorber units shown in FIGS. 2A and 2B.

FIGS. 2A and 2B are schematic depictions of a group of absorber units. FIG. 2A shows a cell 201, with a group of three identical absorber units 211, 212, 213. FIG. 2B shows details of one of the absorber units 211 of FIG. 2A. FIG. 3 is a graphic depiction showing measured absorption (solid line curve 311) and reflection (dashed line curve 312) coefficients of the three identical absorber units shown in FIGS. 2A and 2B. The graphic depiction of FIG. 3 shows an experimental realization of the total absorber.

Still referring to FIGS. 2A and 2B, in one non-limiting example, a single piece of latex membrane 221 with relaxed thickness of 0.2 mm is fixed on one end of a metallic cylindrical tube 223 with radius R=17 mm. A radial pre-stress of $\sim 10^5$ Pa is applied across the membrane. A circular rigid platelet with radius r=6 mm, weighing 0.48 g is adhered to the center of the membrane. The anti-resonance of the MAM in this design is found at ~240 Hz. The other end of the tube is blocked by an aluminum plate 227, which plays the role of a totally reflective surface. Membrane 221 is positioned a predetermined distance from reflective plate 227, as described above. The depth of the cavity is determined by the predetermined distance, and is tunable by adding spacers in front of the reflective metallic plate.

The above dimensions and pressure values are given by way of non-limiting example. The dimensions can vary significantly and are determined by resonant frequencies selected as eigenmodes, and in accordance with the resonant characteristics of the materials used.

The amplitude reflection coefficient $|r|$ and the absorption coefficient $Ab = 1 - |r|^2$ were measured using the impedance tube method. The impedance tube (Brüel & Kjær type-4206) has a diameter of 100 mm. To achieve best performance, three absorber units were installed on a thick aluminum plate, forming a parallel array. The plate was then firmly mounted against the open end of the impedance tube. On the other end was a loudspeaker to generate planar wave in the tube. Two condenser microphones (Brüel & Kjær type-4187) were situated at two positions along the tube in order to separately measure the incident and reflected sound waves.

FIG. 3 is a graphic depiction showing measured absorption (solid line curve) and reflection (dashed line curve) coefficients of the three identical absorber units shown in FIGS. 2A and 2B. Surprisingly, the three absorbing units together only cover less than 35% of the tube's cross-sectional area. The absorption cross-section is larger than the absorber's lateral dimension by a factor of 2.9. FIG. 3 shows a finite-element simulated slice of velocity field near the absorber. It is seen that the MAM's vibration generate large but localized radial components of the air motions. The sound near the reflective surface near the absorber behaves as if being sucked toward the absorber.

Figure 4:
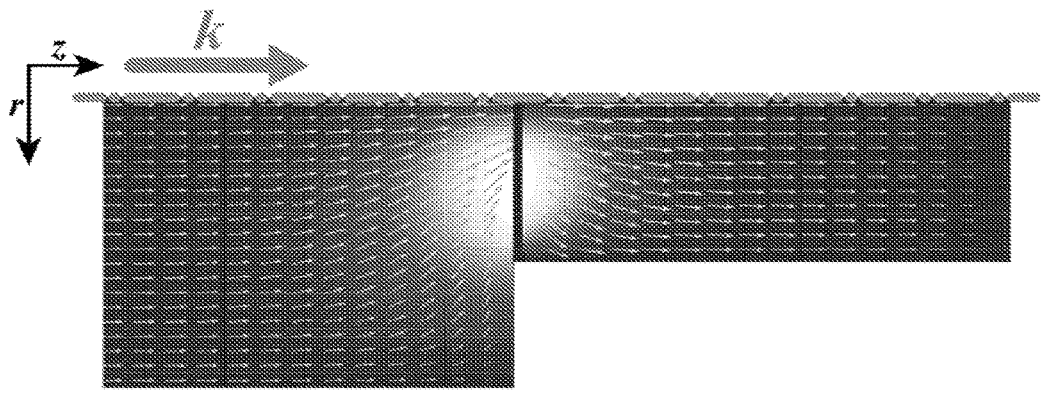
FIG. 4 is a graphic representation showing simulated velocity distribution of the absorber of FIGS. 2A and 2B when excited by a planar acoustic wave. The membrane is delineated by the thick line dividing the two rectangular areas. The horizontal arrow k indicates the direction of sound propagation.

FIG. 4 is a graphic representation showing simulated velocity distribution of the absorber of FIGS. 2A and 2B when excited by a planar acoustic wave. The membrane is delineated by the thick line dividing the two rectangular areas. The horizontal arrow k indicates the direction of sound propagation. Due to the small cross section of the absorber units, total absorption of sound at multiple frequencies is possible. To demonstrate this, an absorber using MANs with mismatched anti-resonance was manufactured, and the MANs were arranged closely together to form a parallel array.

Figure 5:
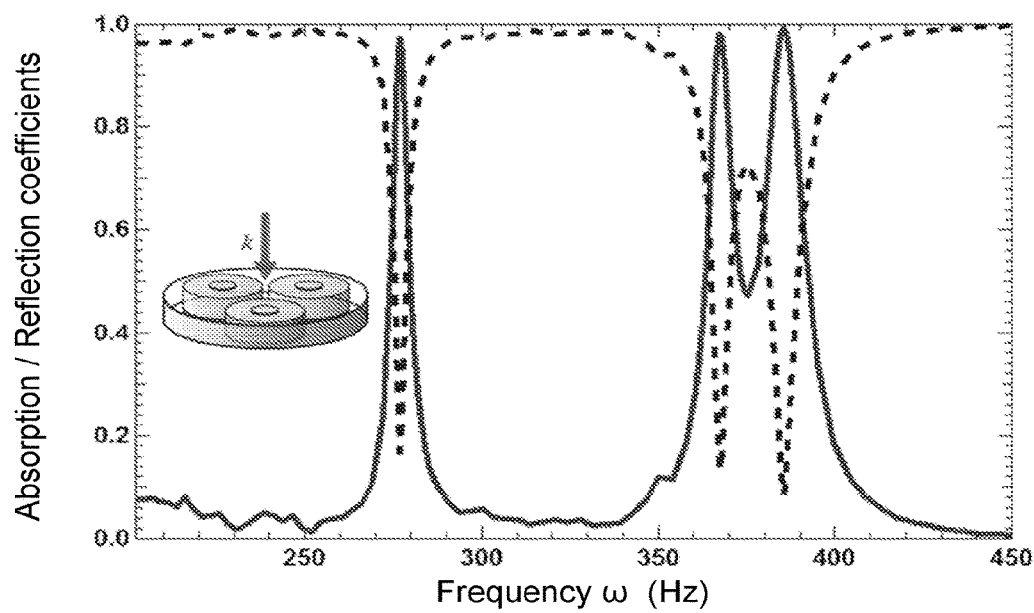
FIG. 5 is a graphic depiction showing measured absorption and reflection coefficients of three absorber units with different operational frequencies.

FIG. 5 is a graphic depiction showing measured absorption and reflection coefficients of three absorber units with different operational frequencies. As shown in FIG. 5, near total absorption at 277 Hz (Ab=0.97), 367 Hz (Ab=0.98) and 385 Hz (Ab=0.99) is observed.

Figure 6:
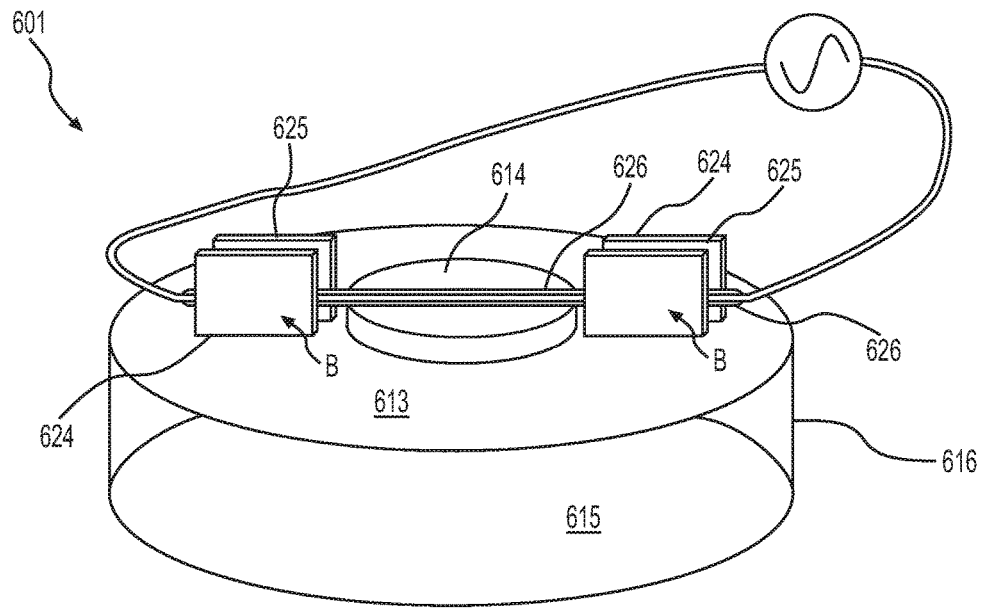
FIG. 6 is a schematic depiction of an energy conversion device, using extraordinary acoustic absorption induced by hybrid resonance.

Electrical Energy Generation by the Extraordinary Acoustic Absorption Induced by Hybrid Resonance In the above configurations, when the super-absorption condition is met, the platelet vibrates at maximum amplitude. According to one modification, such motion of the platelet is converted into electrical power, thereby extracting some of the energy and effectively increasing the energy absorption capacity of the metamaterials. FIG. 6 is a schematic depiction of an energy conversion device 601, using extraordinary acoustic absorption induced by hybrid resonance. Shown are energy conversion device 601 membrane 613 with platelet 614 mounted thereto, reflective backing plate 615 and enclosure 616. Magnets 624 are mounted on membrane 613. Magnets 624 are provided with gaps 625 and conductive rod 626, which serves as a conductor, extends across membrane, 613, through gaps 625 in magnets 624 and is fixed to platelet 614 for movement with platelet 614.

Figure 7A:
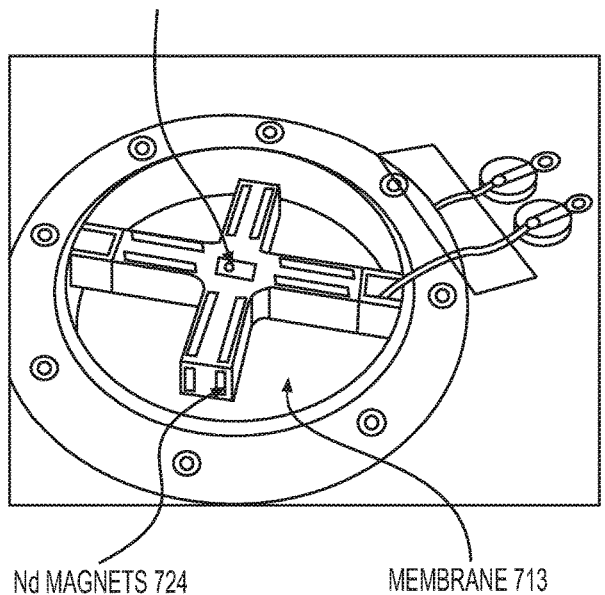
FIG. 7A is a depiction of a configuration used for testing energy conversion, representing the physical characteristics of the energy conversion device of FIG. 6.
Figure 7B:
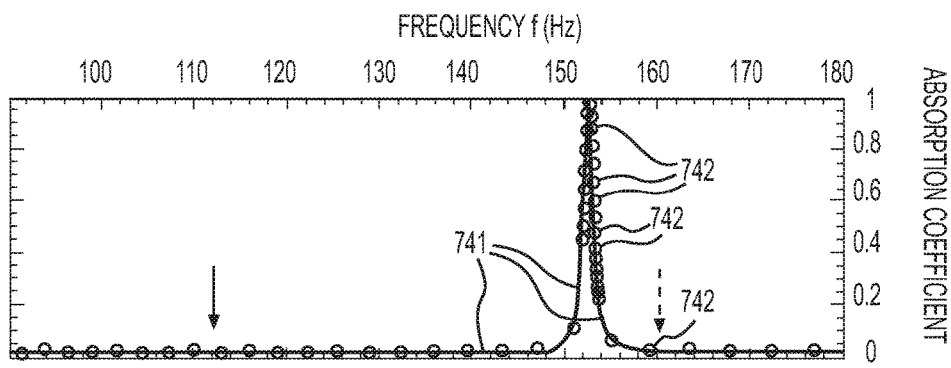
FIGS. 7B-7D are graphic depictions of the response characteristics as measured at the energy conversion device of FIG. 7A.
Figure 7C:
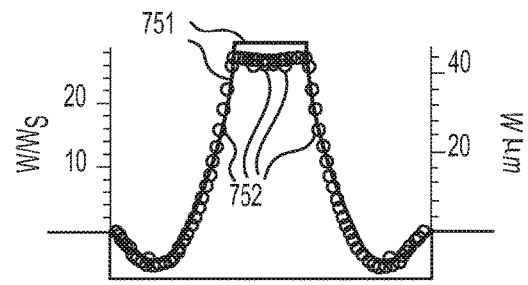
Figure 7D:
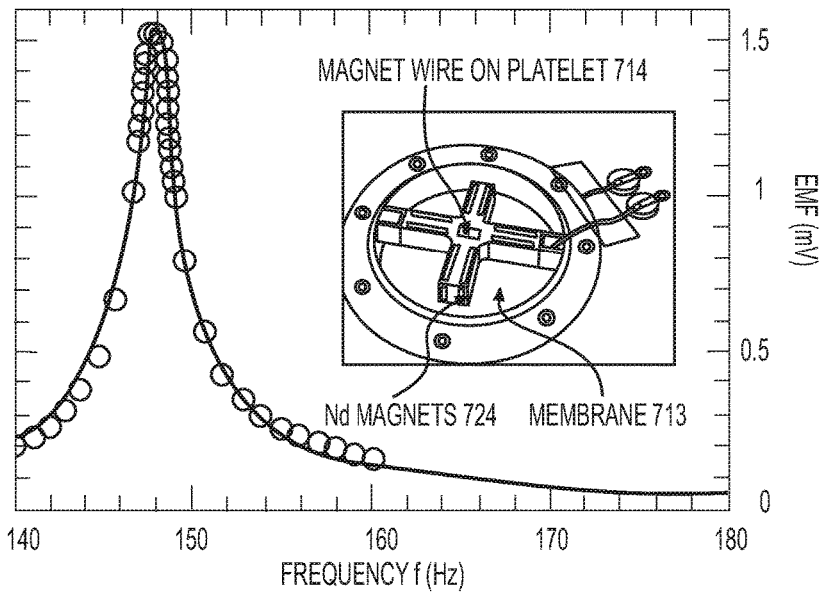

FIG. 7A is a configuration used for testing energy conversion, representing the physical characteristics of the energy conversion device of FIG. 6. Shown are membrane 713, platelet 714 and niobium magnets 724. FIGS. 7B-7D are graphic depictions of the response characteristics of the energy conversion device depicted in FIG. 7A. FIG. 7B depicts absorption coefficient plotted as a function of frequency. The solid arrow indicates $f_1 = \omega_1/(2\pi)$, and the dotted arrow marks $\tilde{f} = \omega/(2\pi)$. Theoretical prediction (solid curve 741) shows excellent agreement with experimental results (circles 742).

FIG. 7C is a plot of a measured vibrational profile at 152 Hz. Solid line plot 751 depicts simulator results and circles 752 depict measured results. This appears as a symmetrical plot, using data along the radial direction on one side. The plot shows the hybrid resonant absorption peak, normalized to an incident wave with an intensity of 1 Pa so that $W_S = 2.5$ μm. The simulation results are plotted as solid curve 751 provide a good comparison with the measured results of circles 752. The large amplitude of the hybrid mode is clearly seen by comparing to the membrane modes in FIG. 7A under the same intensity incident wave.

FIG. 7D is a plot of electromotive force (EMF) generated by vibration of the central platelet as a function of frequency. Electromotive force (EMF) generated by vibration of the central platelet is plotted as a function of frequency, with inset showing the experimental setup. The solid curve is based on simulation and the open circles are from experimental measurements. The shift of the EMF peak from the original hybrid resonance is due to the 7.8% extra mass of the conductive rod or wire and other peripherals linked to the central platelet. An extra 42.5% dissipation is due to the electromagnetic induction.

In the basic configuration of a suspended moving mass such as a platelet suspended by a membrane, a condition of super-absorption is reached if sufficient sound or other vibrational energy is present. When the super-absorption condition is met, the platelet vibrates at maximum amplitude. In the example of FIGS. 7B-7D, such motion of the platelet is converted into electrical power by connecting its motion to the motion of electrically conductive rods or wires cutting the magnetic field lines generated by permanent magnets. This configuration is used to extract power from the motion of the central platelet. In the configuration used for testing the energy conversion, four pairs of the neodymium (Nd) magnets 724 are positioned so that a conductive rod or wire (FIG. 6, item 626), generating about 0.6 T of magnetic field that is perpendicular to both the conductive rod or wire and the direction of motion of platelet 714. The total length of the conductive rod or wire sections inside the magnetic field is 80 mm. With 1 Pa incident sound wave, an electromotive force (EMF) in excess of 1.5 mV is obtained at the hybrid resonance, as depicted in FIG. 7C. The hybrid resonant frequency is slightly lowered to 147 Hz, owing to the additional weight linked to the platelets. With a total of 0.6Ω of electric load, the electric power generated is 3.9 μW, from an incident acoustic power of 17 μW, which is 23% power conversion efficiency. This efficiency is noted to remain the same for over three orders of magnitude variation in the incident sound intensity (2.5 mPa to 5 Pa).

While electromagnetic generation of energy using permanent magnets is given by way of example, it is expected that other means of conversion of mechanical energy to electrical energy will also be effective and within the scope of the present disclosure. By way of non-limiting example, electromagnets can be used to establish an electromagnetic field. It is also possible to extract energy by a capacitive generator arrangement or by piezoelectric electrical generation. Such configurations offer advantages in the manner that the energy extraction by the generation devices is controlled.

Given factors such as hysteresis loss and other inefficiencies of power conversion, the conversion of acoustic energy to electrical energy tends to be lossy. Regardless, the losses tend to be additive as applied to absorption of energy. Therefore, the conversion of acoustic energy to electrical energy has a potential to substantially increase the point of super-absorption by allowing the metamaterial to dissipate energy. In that sense, the platelet or mass without the electric generator would have a maximum amplitude at which it vibrates, but the energy conversion would result in a substantial portion of the acoustic energy being discharged. The energy discharged by the electric generator would, in turn, result in an increase in the amount of acoustic energy absorbed by the metamaterial in order to reach that maximum amplitude.

Hybrid Resonance

To explain the emergence of hybrid resonance and how it matches impedance to the airborne sound, it is possible to first consider MAM's surface-averaged Green function $\langle G_M \rangle$. For simplicity, only the first two lowest frequency eigenmodes are considered, which are Mode 1 and Mode 2 of the MAM shown in FIG. 1B. Higher order modes are included in calculations for the data shown in FIGS. 7B-7D and 8 and for comparison purposes. Therefore $\langle G_M \rangle$ is given by:

$$\langle G_M \rangle = \sum_{i=1}^{2} \frac{|\langle W_i \rangle|^2}{\rho_i(\omega_i^2 - \omega^2)} + 2i\beta \sum_{i=1}^{2} \frac{|\langle W_i \rangle|^2 \omega}{\rho_i(\omega_i^2 - \omega^2)^2}, \quad (1)$$

where $\rho_i \equiv 2\pi d \int_0^a |W_i(r)|^2 \rho(r) r \, dr$ is a parameter related to the displacement-weighted mass density for membrane's i th eigenmode, a=45 mm and d=0.2 mm denote the radius and thickness of the membrane, respectively,
ρ(r) is the local mass density, and
$\omega_1=2\pi\times112$ Hz, $\omega_2=2\pi\times888$ Hz are the relevant angular eigenfrequencies.

Equation (1) assumes that the dissipation coefficient β is small, so that the dimensionless β/ω<<1. The value of β will be determined by fitting to the experiment. From Eq. (1), MAM's impedance is given by $$Z_M=(-i\omega\langle G_M\rangle)^{-1}.$$

In FIG. 7B, the solid arrow is on the left is the membrane's first eigenmode. The dashed arrow on the right is the membrane's anti-resonance. It is possible to locate the MAM's anti-resonance frequency $\omega=2\pi\times163$ Hz, between the two eigenfrequencies, located by the dashed arrow in FIG. 7B, by the condition Re$\langle G_M\rangle$=0. This is obvious since $|Z_M|\to\infty$ at $\tilde\omega$, if the system is without dissipation, i.e., β=0, implying decoupling from the incident wave. In anticipation of the fact that the hybrid resonance frequency is always close to $\tilde\omega$, it is convenient to further simplify Eq. (1) by treating $\Delta\omega=\tilde\omega-\omega$ as a small parameter. The derivative of Re $\langle G_M\rangle$ respect to frequency is denoted, and is evaluated at $\tilde\omega$, as 2Ξ. By expanding it around $\tilde\omega$ to the first order in Δω, Eq. (1) can be simplified to the form:

$$\langle G_M\rangle \simeq 2\Xi(i\beta - \Delta\omega),$$

where $$\Xi \equiv \sum_{i=1}^{2} |\langle W_i\rangle|^2 \tilde\omega / [\rho_i(\omega_i^2 - \tilde\omega^2)^2].$$

The membrane's two eigenmodes are hybridized by the sealed gas layer, which adds an extra impedance $Z'\equiv\langle\delta p\rangle/\langle\dot W\rangle$ to the system. Since the sealed gas' thickness is orders of magnitude smaller than the relevant wavelength, it can be regarded as undergoing uniform adiabatic compression and expansion in response to membrane's movement, which resolves to:

$$\delta p=-\gamma(p/s)\delta s,$$

where δs denotes variation of gas layer thickness and γ is the adiabatic index.

As $\langle\dot W\rangle=-i\omega(-\delta s)$ from the continuity of displacement (positive $\langle W\rangle$ is along the incident wave direction), we obtain $Z'=i\gamma p/(s\omega)$. The total impedance of this stacked system is $Z_h=Z_M+Z'$, so that the Green function of the total system is given by $$\langle G_h\rangle=(-i\tilde\omega Z_h)^{-1}. \quad (2)$$

By examining the imaginary part of $\langle G_h\rangle$, it is easy to see that the original resonances at $\omega_1$ and $\omega_2$ are replaced by a new hybridized resonance at $\omega_h$, characterized by the condition Im($Z_h$)=0, so that $$\text{Im}\langle G_h\rangle = \frac{1}{\tilde\omega}\frac{\text{Re}(Z_M)}{\text{Re}(Z_M)^2+\text{Im}(Z_h)^2} \quad (3)$$

reaches a peak. A peak in the imaginary part of the Green function signifies a (resonant) mode. Here it is precisely the hybrid resonance.

Since the imaginary part of $Z_h$ is zero at the hybrid resonance, it becomes possible to achieve perfect matching with the impedance of air, $Z_0$. The relevant conditions are $$\text{Im}(Z_h/Z_0) = \frac{1}{\bar s} - \frac{1}{2\bar\Xi}\frac{\Delta\bar\omega_h}{\bar\beta^2+\Delta\bar\omega_h^2} = 0, \quad (4a)$$

$$\text{Re}(Z_h/Z_0) = \frac{1}{2\bar\Xi}\frac{\bar\beta}{\bar\beta^2+\Delta\bar\omega_h^2} = 1. \quad (4b)$$

Here $\bar\Xi=\Xi/(\tilde\omega^{-2}Z_0^{-1})$, $\bar\beta=\beta/\tilde\omega$, $\bar s=s/(\gamma p Z_0^{-1}\tilde\omega^{-1})$, and $\Delta\bar\omega_h=1-\omega_h/\tilde\omega$ denote the relevant parameters in their dimensionless form. Although the material dissipation coefficient β cannot be easily adjusted, this hybrid impedance-matching condition is still robust as we have other two parameters $\bar s$ and $\Delta\bar\omega_h$, which can be easily tuned by adjusting system parameters.

Figure 9A:
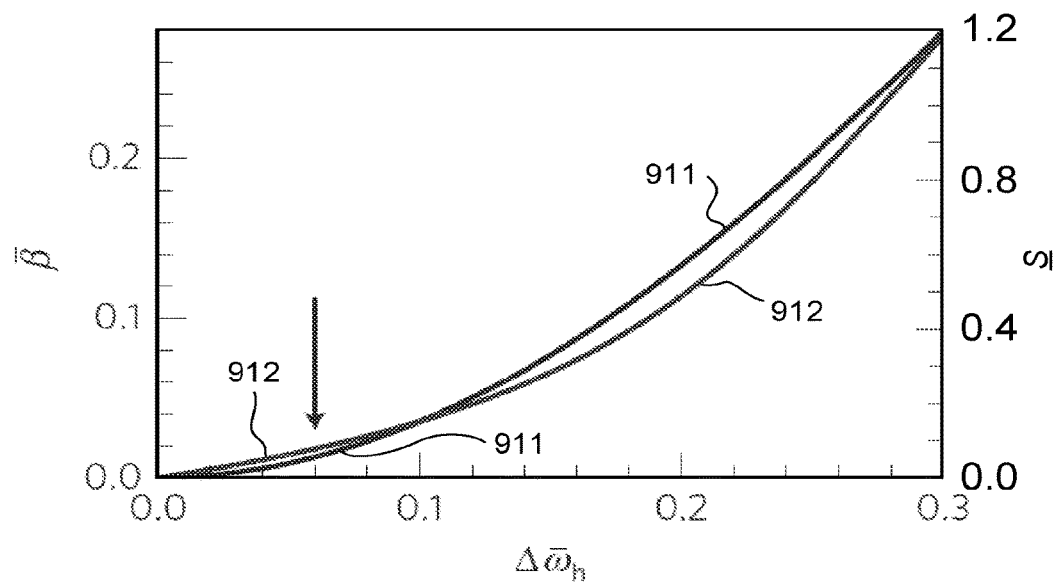
FIGS. 9A and 9B are graphic representation of relationships between different parameters at the impedance-matched hybrid resonant frequency.

Based on the first four eigenfunctions of the MAM, the evaluated dimensionless $\bar\Xi$=0.59. In FIG. 9A t $\bar\beta$ and $\bar s$ are plotted, which satisfies the impedance matching condition as a function of $\Delta\bar\omega_h$. In particular, the value $\Delta\bar\omega_h$=0.065 (pointed by the arrow) corresponds with the observed impedance-matching at $\omega_h=2\pi\times152$ Hz. One can evaluate the fitted dissipation coefficient $\bar\beta$=0.00502 (β=5.14 Hz), and predict the thickness of the SF6 (γ=1.0984) gas layer to be $\bar s$=0.0772 (s=17.2 mm). The latter is noted to be in excellent agreement with the experimental value of s=17 mm. Here it is noted that SF6 is chosen in this example for its smaller adiabatic index, which reduces s by ~27% compared to that for air (γ=1.4). Furthermore, from the reflection coefficient determined by R=($Z_0-Z_h$)/($Z_0+Z_h$), it is possible to calculate the absorption coefficient as $1-|R|^2$, plotted in FIG. 7B. Excellent agreement with the experiment is seen.

Figure 9B:
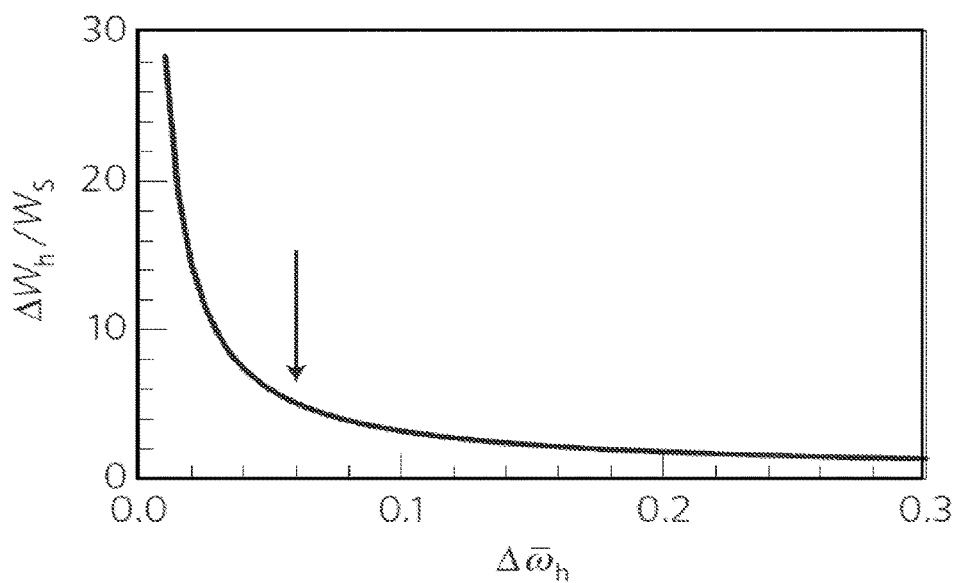

It is unexpected that the results indicate that achieving total absorption requires only weak material dissipation (small $\bar\beta$). The reason is that the relevant membrane displacement component ΔW, which is deaf, can be very large. When a small absorption coefficient is multiplied by a large energy density, the resulting absorption can still be appreciable. In FIG. 9b $\Delta W_h/W_S$, is plotted as a function of $\Delta\bar\omega_h$. In agreement with predicted results, the magnitude of $\Delta W_h$ is seen to diverge at $\tilde\omega(\Delta\bar\omega_h=0)$, at which point $\bar s$ and $\bar\beta$ approach zero. This can be understood by realizing that the hybrid mode still retains the characteristics of the two membrane eigenmodes, so that at $\omega_h$ (which is close to $\tilde\omega$) the magnitudes of two MAM modes' amplitudes, $\langle W_1\rangle$ and $\langle W_2\rangle$, must be comparable, i.e., $\langle W_2\rangle/\langle W_1\rangle\approx 1$. However, impedance-match implies $\langle W_1\rangle-\langle W_2\rangle=\langle W_h\rangle=W_S$. These two conditions can only be satisfied when $\langle W_{1,2}\rangle>>W_S$, so that $1-\langle W_2\rangle/\langle W_1\rangle=W_S/\langle W_1\rangle$ is a small number.

FIGS. 8A and 8B are diagrams showing unity absorption (>99%) attained at tunable multiple frequencies. FIG. 8A shows an arrangement in which an impedance tube 805 contains three hybrid resonant units 811, 812, 813, which are packed closely together. FIG. 8B is a graphic depiction showing eigenfrequencies and anti-resonances of the configuration of FIG. 8A.

Based on treating the impedances of the three units to be in parallel, theoretical prediction (solid curve) shows excellent agreement with the experiment (open circles). The numbered peaks 811', 812', 813' formed by the circles correspond with that of the respective hybrid resonant units 811, 812, 813. The solid arrows mark the relevant first eigenfrequencies and the dashed arrows mark the relevant anti-resonances. The anti-resonance frequency for unit 813 is outside the figure's scale at 514 Hz.

FIGS. 9A and 9B are graphic representation of relationships between different parameters at the impedance-matched hybrid resonant frequency. FIG. 9A shows the dimensionless dissipation parameter, as curve 911, and the thickness of the sealed gas layer, as curve 912, plotted as a function of $\Delta \bar{\omega}_h$. FIG. 9B shows the variance of normal displacement at the hybrid resonance frequency plotted as a function of $\Delta \bar{\omega}_h$. In order to be impedance matched to the airborne sound, the surface-averaged displacement would be equal to that of the incident sound, i.e. $\langle w_h \rangle = \langle w_1 \rangle - \langle w_2 \rangle = w_S$. Despite this, proximity to $\bar{\omega}$ means that $\langle w_1 \rangle \approx \langle w_2 \rangle$. These two conditions imply very large maximum amplitude for $w_h$ as compared to its surface average, and account for the large variance in the displacement. In particular, the large $\Delta w_h$ is seen to dovetail with the small absorption coefficient in a self-consistent manner for achieving the total absorption, which is established by impedance matching.

Wind Power Extraction

Figure 10A:
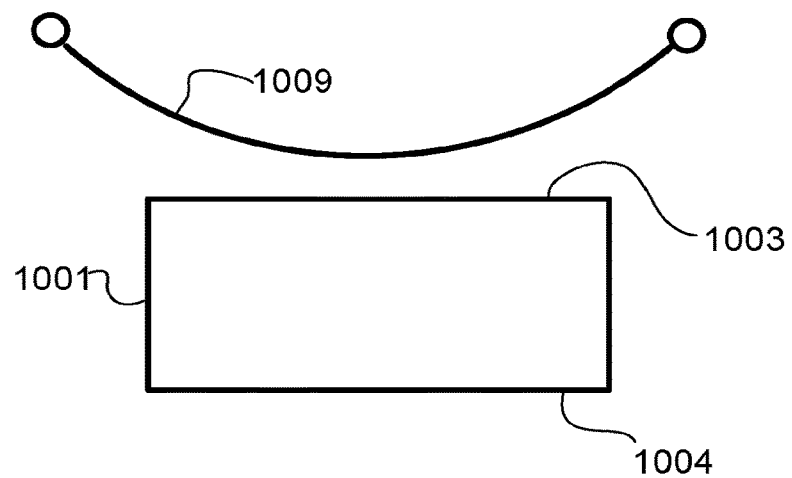
FIGS. 10A and 10B are schematic diagrams showing an energy absorbing metamaterial cell used to generate electric energy from wind.
Figure 10B:
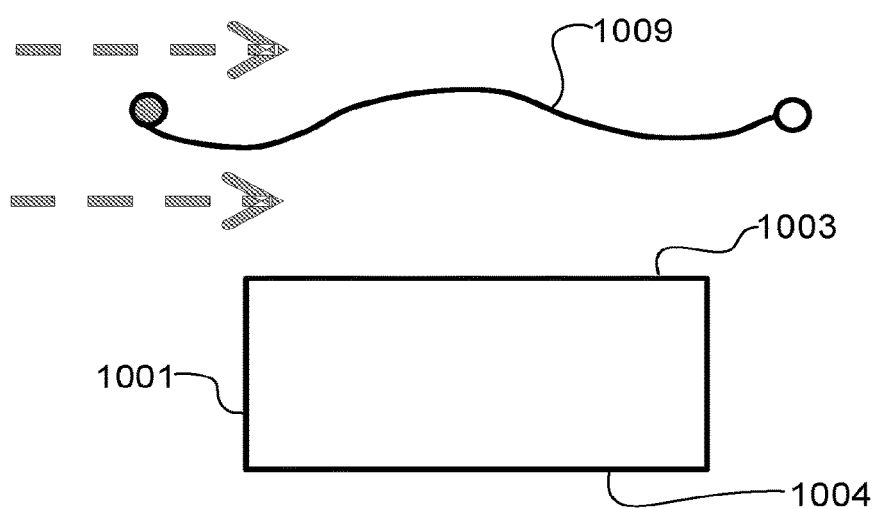

FIGS. 10A and 10B are schematic diagrams showing an energy absorbing metamaterial cell 1001 used to generate electric energy from wind. Depicted are cell 1001, with membrane 1003 and reflecting plate 1004. Also depicted is thin flexible sheet 1009. FIG. 10A shows the cell in a static condition, whereas FIG. 10B shows the cell in a wind condition, with the wind blowing laterally across cell 1001 as represented by the arrows. Cell 1001 is provided with an electric generator as described above.

To generate electrical energy from the wind, flexible sheet 1009 is positioned above and close to membrane 1003 facing sheet 1009. As depicted in FIG. 10A, sheet 1009 is loose so when there is no wind it drapes down toward cell 1001 (if cell 1001 is positioned membrane-up with sheet 1009 above it). When there is wind blowing, as indicated by the arrows, sheet 1009 flaps in the manner of a flag in the wind and undulates. The flapping and undulation cause corresponding changes in the air pressure between cell 1001 and sheet 1009. The resulting pressure undulation acts as a random driving source over a broad frequency band. This pressure will excite the super absorption resonance mode of the cell and cause the central plate to vibrate at maximum amplitude, therefore generating maximum amount of electric energy.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A sound absorbing metamaterial comprising
an acoustic impedance-matched surface configured to minimize reflection from an incident acoustic wave, the surface comprising:
an elastic or flexible membrane;
a relatively solid surface provided as a reflective surface and positioned behind the membrane and separated by a predetermined distance from the elastic or flexible membrane and forming a fluid space between the membrane and the solid surface; and
a substantially rigid mass mounted on the membrane, whereby the elastic membrane with the mass establish a plurality of eigenfrequencies for resonance.

2. The sound absorbing metamaterial of claim 1, wherein: the eigenfrequencies are selected so that the metamaterial causes an incident acoustic wave to generate minimal reflection of acoustic energy.

3. The sound absorbing metamaterial of claim 1, wherein: the membrane and the reflective surface form part of a sealed enclosure sufficiently sealed to establish a sealed or restricted enclosure comprising the fluid space, the sealing or restriction restricting escape or intake of fluid resulting from acoustic vibrations.

4. The sound absorbing metamaterial of claim 3, wherein the structure provides an anomalous effective mass density behavior of membrane-type acoustic metamaterials (MAMs) near an anti-resonance state, which, in combination with the reflective surface and the fluid space between the membrane and the solid surface, can match the impedance of air at predetermined frequencies, thereby substantially attenuating reflected sound and allowing substantial absorption of incident acoustic waves.

5. The sound absorbing metamaterial of claim 3, further comprising:
the substantially rigid mass having a lateral dimension smaller than a lateral dimension of the sealed or restricted enclosure.

6. The sound absorbing metamaterial of claim 3, wherein the fluid space between the membrane and the solid surface has a height established by the predetermined distance from the elastic or flexible membrane at a mean or resting position of the membrane, and a radius of the sealed enclosure are much smaller than the wavelengths of sound in air at the eigenfrequencies.

7. The sound absorbing metamaterial of claim 1, wherein the predetermined distance of separation of the flexible membrane from the relatively solid surface corresponds to a maximum peak amplitude or a semi amplitude of the incident acoustic wave minus energy absorbed at the elastic membrane.

8. The sound absorbing metamaterial of claim 1, further comprising the membrane having a predetermined amount of in-planar pre-stress applied thereto.

9. The sound absorbing metamaterial of claim 1, further comprising:
the relatively solid surface provided as a reflective surface comprising a hard material having acoustic reflecting characteristics.

10. The sound absorbing metamaterial of claim 1, further comprising:
the relatively solid surface provided as a reflective surface comprising a soft material having acoustic absorption characteristics.

11. The sound absorbing metamaterial of claim 1, further comprising:
an electrical generator operatively connected to the membrane, and capable of extracting vibrational energy from the membrane sufficiently to attenuate the vibrational energy, the extracting of the vibrational energy converting part of the absorbed sound energy into electrical energy.

12. The sound absorbing metamaterial of claim 11, further comprising:
a permanent magnet affixed to at least one of the membrane or a region adjacent the membrane;
an electrical conductor fixed to the sound absorbing metamaterial in such a way that movement of the membrane results in relative movement between the permanent magnet and the electrical conductor; and
electrical connections with the electrical conductor capable of extracting electrical energy from the electrical conductor.

13. The sound absorbing metamaterial of claim 11, further comprising:

a thin sheet supported above the membrane and separated from the membrane sufficiently to respond to wind movement, whereby the wind movement causes the thin sheet to flap and undulate, resulting in pressure changes at the membrane, thereby generating electrical energy in response to the wind movement.

14. The sound absorbing metamaterial of claim 1, further comprising:
an electrical generator operatively connected to the membrane, and capable of extracting vibrational energy from the membrane sufficiently to attenuate the vibrational energy, the extracting of the vibrational energy providing an increase in a maximum energy absorption of the sound absorbing metamaterial beyond that afforded by the sound absorbing metamaterial without the electrical generator.

15. A sound absorbing metamaterial comprising
an acoustic impedance-matched surface configured to minimize reflection from an incident acoustic wave, the surface comprising:
an elastic or flexible membrane;
a relatively solid surface provided as a reflective surface and positioned behind the membrane and separated by a predetermined distance from the elastic or flexible membrane and forming a fluid space between the membrane and the solid surface;
a substantially rigid mass mounted on the membrane, whereby the elastic membrane with the mass establish a plurality of eigenfrequencies; and
an electric generator responsive to movement of the membrane.

16. The sound absorbing metamaterial of claim 15, wherein:
the eigenfrequencies are selected so that the metamaterial causes an incident acoustic wave to generate minimal reflection of acoustic energy.

17. The sound absorbing metamaterial of claim 15, wherein:
the membrane and the reflective surface form part of a sealed enclosure sufficiently sealed to establish a sealed or restricted enclosure comprising the fluid space, the sealing or restriction restricting escape or intake of fluid resulting from acoustic vibrations.

18. The sound absorbing metamaterial of claim 17, wherein the structure provides an anomalous effective mass density behavior of membrane-type acoustic metamaterials (MAMs) near an anti-resonance state, which, in combination with the reflective surface and the fluid space between the membrane and the solid surface, can match the impedance of air at predetermined frequencies, thereby substantially attenuating reflected sound and allowing substantial absorption of incident acoustic waves.

19. The sound absorbing metamaterial of claim 17, further comprising:
the substantially rigid mass having a lateral dimension smaller than a lateral dimension of the sealed or restricted enclosure.

20. The sound absorbing metamaterial of claim 17, wherein the fluid space between the membrane and the solid surface has a height established by the predetermined distance from the elastic or flexible membrane at a mean or resting position of the membrane, and a radius of the sealed enclosure are much smaller than the wavelengths of sound in air at the eigenfrequencies.

21. The sound absorbing metamaterial of claim 15, wherein the predetermined distance of separation of the flexible membrane from the relatively solid surface corresponds to a maximum peak amplitude or a semi amplitude of the incident acoustic wave minus energy absorbed at the elastic membrane.

22. The sound absorbing metamaterial of claim 15, further comprising the membrane having a predetermined amount of in-planar pre-stress applied thereto.

23. The sound absorbing metamaterial of claim 15, further comprising:
the relatively solid surface provided as a reflective surface comprising a hard material having acoustic reflecting characteristics.

24. The sound absorbing metamaterial of claim 15, further comprising:
the relatively solid surface provided as a reflective surface comprising a soft material having acoustic absorption characteristics.

25. The sound absorbing metamaterial of claim 15, further comprising:
an electrical generator operatively connected to the membrane, and capable of extracting vibrational energy from the membrane sufficiently to attenuate the vibrational energy, the extracting of the vibrational energy converting part of the absorbed sound energy into electrical energy.

26. The sound absorbing metamaterial of claim 25, further comprising:
a permanent magnet affixed to at least one of the membrane or a region adjacent the membrane;
an electrical conductor fixed to the sound absorbing metamaterial in such a way that movement of the membrane results in relative movement between the permanent magnet and the electrical conductor; and
electrical connections with the electrical conductor capable of extracting electrical energy from the electrical conductor.

27. The sound absorbing metamaterial of claim 25, further comprising:
a thin sheet supported above the membrane and separated from the membrane sufficiently to respond to wind movement, whereby the wind movement causes the thin sheet to flap and undulate, resulting in pressure changes at the membrane, thereby generating electrical energy in response to the wind movement.

28. The sound absorbing metamaterial of claim 15, further comprising:
an electrical generator operatively connected to the membrane, and capable of extracting vibrational energy from the membrane sufficiently to attenuate the vibrational energy, the extracting of the vibrational energy providing an increase in a maximum energy absorption of the sound absorbing metamaterial beyond that afforded by the sound absorbing metamaterial without the electrical generator.

29. A sound absorbing metamaterial comprising
means for providing an acoustic impedance-matched surface configured to minimize reflection from an incident acoustic wave, the surface comprising:
elastic or flexible membrane;
reflective means, positioned behind the membrane means and separated from the membrane means by a predetermined distance and forming a fluid space between the membrane and the solid surface; and
a substantially rigid mass mounted on the membrane;
means, comprising the membrane and rigid mass, to establish a plurality of eigenfrequencies for resonance.

30. The sound absorbing metamaterial of claim 29, further comprising:

electrical generator means to extract the vibrational energy from the sound absorbing metamaterial to provide an increase in a maximum energy absorption of the sound absorbing metamaterial beyond that afforded by the sound absorbing metamaterial without the electrical generator.

* * * * *